(12) United States Patent
Wakabayashi et al.

(10) Patent No.: US 12,249,868 B2
(45) Date of Patent: Mar. 11, 2025

(54) ROTATING ELECTRIC MACHINE

(71) Applicant: SINFONIA TECHNOLOGY CO., LTD., Tokyo (JP)

(72) Inventors: Hiroki Wakabayashi, Tokyo (JP); Tatsuya Nemoto, Tokyo (JP); Toshiaki Kawabata, Tokyo (JP); Takakuni Iitsuka, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 322 days.

(21) Appl. No.: 17/672,017

(22) Filed: Feb. 15, 2022

(65) Prior Publication Data
US 2022/0263358 A1 Aug. 18, 2022

(30) Foreign Application Priority Data
Feb. 17, 2021 (JP) ................................. 2021-023115

(51) Int. Cl.
*H02K 1/16* (2006.01)
*H02K 1/20* (2006.01)
*H02K 3/24* (2006.01)

(52) U.S. Cl.
CPC ............... *H02K 1/165* (2013.01); *H02K 1/20* (2013.01); *H02K 3/24* (2013.01)

(58) Field of Classification Search
CPC ............ H02K 3/32; H02K 3/34; H02K 3/345; H02K 9/19; H02K 9/193; H02K 9/197; H02K 9/20; H02K 1/20; H02K 1/165; H02K 3/24; H02K 1/325
USPC ....................................................... 310/179
See application file for complete search history.

(56) References Cited

U.S. PATENT DOCUMENTS

| 3,098,941 A * | 7/1963 | Willyoung | H02K 3/24 310/262 |
| 4,149,100 A | 4/1979 | Spirk | |
| 5,468,907 A | 11/1995 | Frankenhauser et al. | |
| 6,459,180 B1 | 10/2002 | Mori et al. | |

(Continued)

FOREIGN PATENT DOCUMENTS

| FR | 2992493 A1 * | 12/2013 | ............... H02K 3/28 |
| GB | 2525157 A  * | 10/2015 | ............. H02K 9/197 |

(Continued)

OTHER PUBLICATIONS

English translation of WO 2019154658 A2 attached as NPL (Year: 2019).*

(Continued)

*Primary Examiner* — Alex W Mok
(74) *Attorney, Agent, or Firm* — WHDA, LLP

(57) ABSTRACT

A rotating electric machine 100 having a rotor 1, a stator 2, and a coil 3 including a coil conductor 31 wound around teeth 21b provided on at least one of the rotor 1 and the stator 2 includes a spacer section 42 configured to extend along a slot S formed between the teeth 21b and to be inserted between turns of the coil conductor 31 to define a gap G between the turns, and a cooling medium supply section 6 configured to distribute a cooling medium in the gap G. A notched section 421 cut out in such a manner that a widthwise dimension of the spacer section 42 is relatively short is provided in a middle of an extension of the spacer section 42.

18 Claims, 10 Drawing Sheets

(56) References Cited

U.S. PATENT DOCUMENTS

| | | | |
|---|---|---|---|
| 7,812,501 B2* | 10/2010 | Taniyama | H02K 1/32 310/52 |
| 2003/0042817 A1 | 3/2003 | Tsuneyoshi et al. | |
| 2007/0252473 A1* | 11/2007 | Taniyama | H02K 1/32 310/58 |
| 2009/0078448 A1 | 3/2009 | Tillner | |
| 2019/0131841 A1* | 5/2019 | Mashkin et al. | H02K 15/0006 310/196 |
| 2020/0052539 A1* | 2/2020 | Hsu | H02K 15/14 310/179 |
| 2020/0169136 A1* | 5/2020 | Sercombe | H02K 21/16 |

FOREIGN PATENT DOCUMENTS

| | | | | |
|---|---|---|---|---|
| JP | H02-290138 A | 11/1990 | | |
| JP | 9-215240 A | 8/1997 | | |
| JP | 2003-9436 A | 1/2003 | | |
| JP | 2003-70191 A | 3/2003 | | |
| JP | 2005-057884 A | 3/2005 | | |
| JP | 2010124657 A * | 6/2010 | | H02K 9/197 |
| WO | 2018/218314 A1 | 12/2018 | | |
| WO | WO 2019154658 A2 * | 8/2019 | | H02K 9/223 |
| WO | 2020/240173 A1 | 12/2020 | | |

OTHER PUBLICATIONS

English translation of JP 2010124657 A attached as NPL (Year: 2010).*

English translation of FR 2992493 A1 attached as NPL (Year: 2013).*

Extended European Search Report dated Jul. 20, 2022, issued in counterpart EP application No. 22154194.9. (10 pages).

Office Action dated May 27, 2024, issued in counterpart EP application No. 22154194.9. (7 pages).

Office Action dated Sep. 3, 2024, issued in counterpart JP application No. 2021-023115 with English machine translation. (9 pages).

Office Action dated Dec. 24, 2024, issued in counterpart JP application No. 2021-023115 with English machine translation. (9 pages).

* cited by examiner

ROTATING ELECTRIC MACHINE

BACKGROUND

Field of the Invention

The present invention relates to a rotating electric machine.

Description of the Related Documents

Machines that perform mutual conversion between mechanical and electrical energy and have a rotating part, such as motors and generators, are collectively called rotating electric machines and are installed in a variety of equipment.

A rotating electric machine is equipped with a rotor and a stator. At least one of them is provided with a plurality of teeth arranged in a circumferential direction, and the rotor rotates when electric power is supplied to a coil in which a coil conductor is wound around the teeth.

In general, a cooling structure is provided in a rotating electric machine to release the heat generated by the power supply to the outside. For example, in the cooling structure disclosed in WO 2018/218314, a housing is provided to house a coil conductor wound around each of teeth, and a cooling fluid flows into the housing to directly cool the coil conductor.

For example, in fan motors for propulsion of aircraft (electric aircraft), a high power density of approximately 5 to 10 kW/kg is required, and to achieve this, downsizing as much as possible is promoted. However, as the size of the rotating electric machine decreases, the surface area decreases with the decrease in volume, making it difficult for the generated heat to escape to the outside. Therefore, a cooling structure that can achieve especially high cooling performance is required for a rotating electric machine that achieves such a high power density.

The present invention has been made to solve the above issue, and it is intended to provide a cooling structure of a rotating electric machine that can achieve high cooling performance.

SUMMARY

The present invention has implemented the following means in order to achieve the above object.

That is, the present invention is a rotating electric machine having a rotor, a stator, and a coil including a coil conductor wound around teeth provided on at least one of the rotor and the stator, and includes a spacer section configured to extend along a slot formed between the teeth and to be inserted between turns of the coil conductor to define a gap between the turns, and a cooling medium supply section configured to distribute a cooling medium in the gap. A notched section cut out in such a manner that a widthwise dimension of the spacer section is relatively short is provided in a middle of an extension of the spacer section.

According to this configuration, a gap is formed between the turns of the coil conductor, and the cooling medium is distributed therein, and thus the contact area between the coil conductor and the cooling medium is sufficiently secured, and the coil is effectively cooled. In addition, the notched section is provided in the middle of the extension of the spacer section to form a locally wide region in the middle portion of the gap that is a flow channel of the cooling medium. The turbulence in the flow of the cooling medium and the stirring of the cooling medium as it passes through the non-straight shaped flow channel improves the heat transfer coefficient. In addition, the notched section provided in the spacer section reduces the contact area between the coil conductor and the spacer section, which increases the contact area (that is, the heat dissipation area) between the coil conductor and the cooling medium. The improvement in the heat transfer coefficient and the increase in the heat dissipation area both lead to the improvement in the heat dissipation capability, thus achieving high cooling performance.

Preferably, in the rotating electric machine, a plurality of the notched sections are provided in the middle of the extension of the spacer section.

According to this configuration, a plurality of locally wide regions are formed in the middle portion of the gap that is a flow channel of the cooling medium. Therefore, the stirring action of the cooling medium is enhanced, and the heat transfer coefficient (and thus the heat dissipation capability) is greatly improved. This allows for particularly high cooling performance.

Preferably, in the rotating electric machine, the plurality of the notched sections are disposed at a fixed pitch.

According to this configuration, the heat dissipation capability is less likely to be biased depending on the location, and the coil is uniformly cooled.

Preferably, in the rotating electric machine, at least one of corner portions of the notched section has a round shape.

At least one of the corner portions of the notched section is made into a round shape, and thus the stagnation of the cooling medium is less likely to occur in the vicinity of the corner portion. The formation of stagnation of the cooling medium may reduce the heat transfer coefficient (and thus the heat dissipation capability), but the suppression of the occurrence of stagnation suppresses the resulting reduction in heat dissipation capability.

Preferably, in the rotating electric machine, at least one of the corner portions of the notched section has a taper shape.

At least one of the corner portions of the notched section is made into a taper shape to suppress the occurrence of stagnation of the cooling medium in the vicinity of the corner portions, while also ensuring the stirring effect of the cooling medium at the corner portions. Therefore, it is possible to improve the heat transfer coefficient by stirring the cooling medium while suppressing the decrease in the heat transfer coefficient derived from the stagnation, and the heat dissipation capability can be increased in a balanced manner.

Preferably, in the rotating electric machine, the lengthwise dimension of the notched section is specified within a range such that a pressure loss when the cooling medium is distributed in the gap is equal to or less than a predetermined value.

According to this configuration, since the pressure loss when distributing the cooling medium in the gap is equal to or less than a predetermined value, the load on the mechanism (e.g., a pump) for distributing the cooling medium can be reduced.

According to the present invention, a high cooling performance is achieved, and thus the rotating electric machine can be sufficiently cooled.

DETAILED DESCRIPTION

Hereinafter, an embodiment of the present invention is described with reference to the drawings.

<1. Configuration of Rotating Electric Machine>

Figure 1:
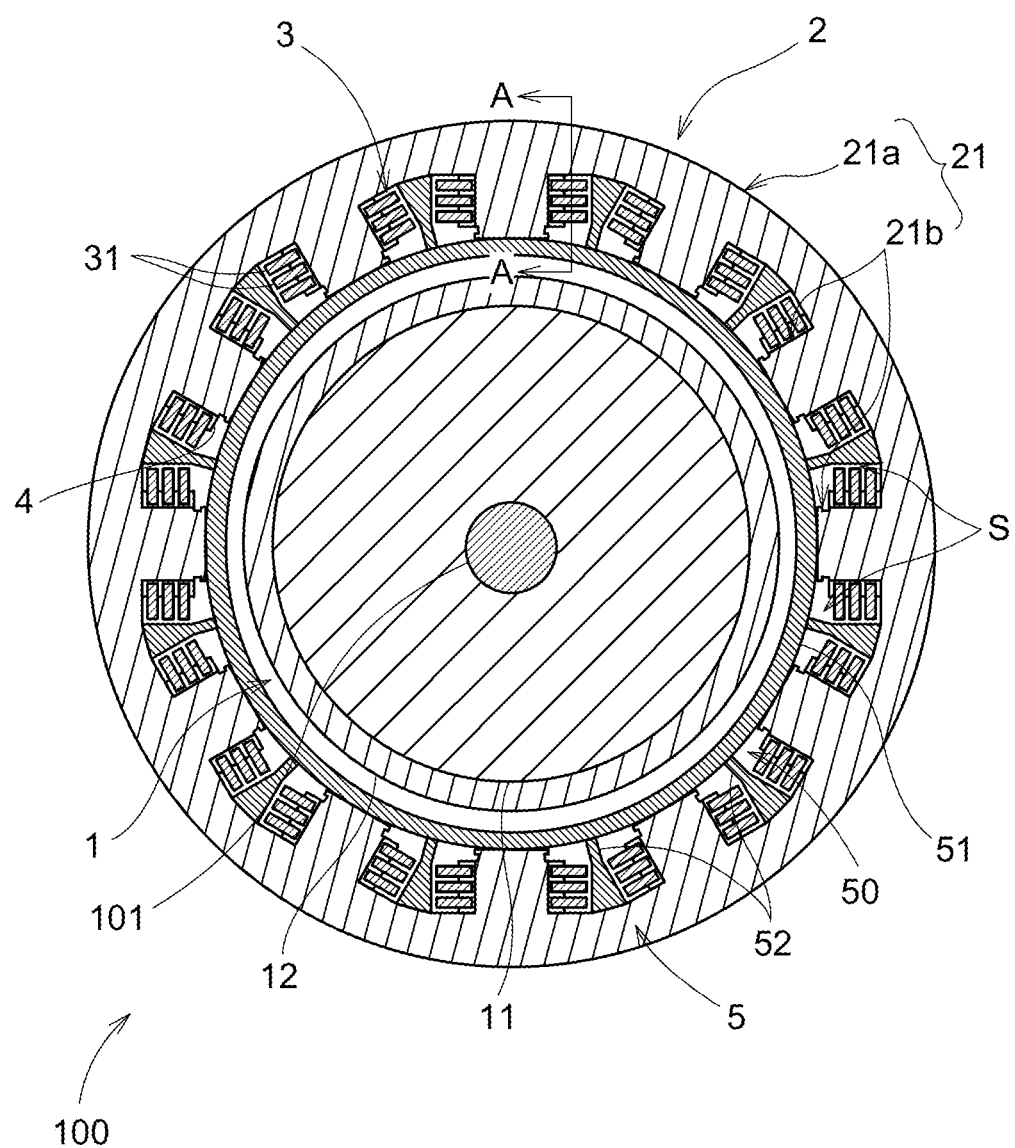
FIG. 1 is a longitudinal cross-sectional view of a rotating electric machine according to an embodiment.
Figure 2:
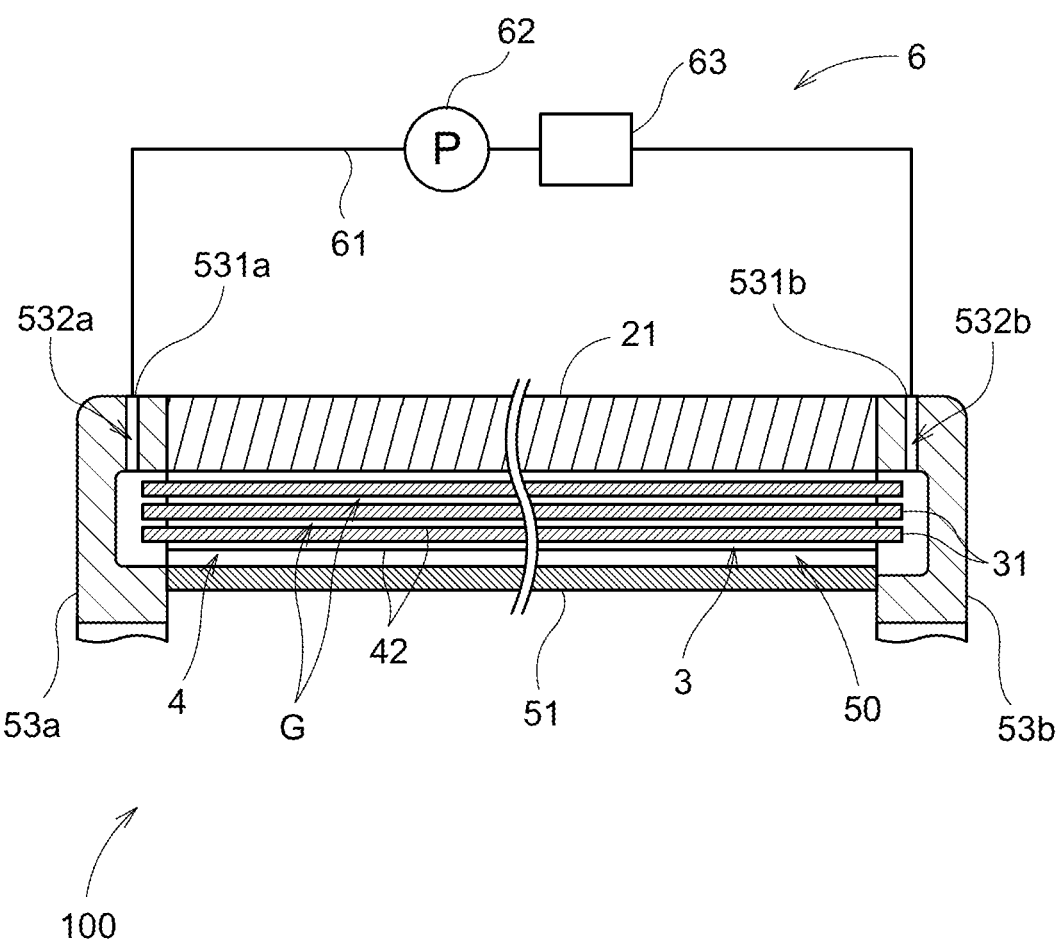
FIG. 2 is a cross-sectional view of a rotating electric machine viewed from the direction of arrow A in FIG. 1.
Figure 3A:
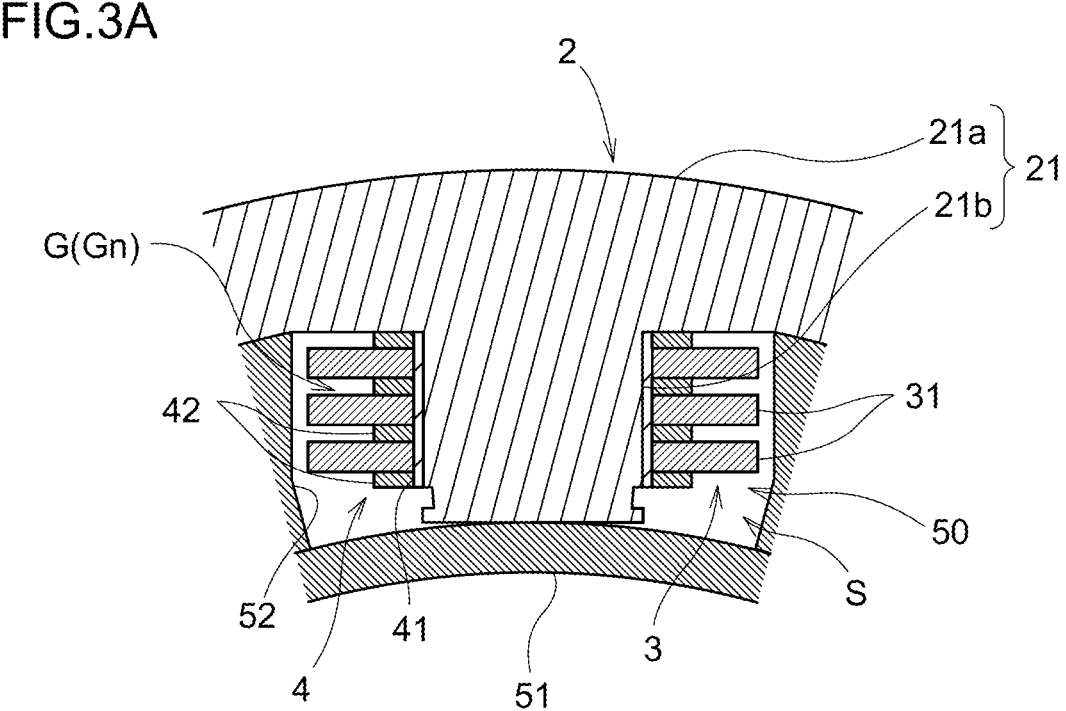
FIGS. 3A and 3B are longitudinal cross-sectional views of a part of the rotating electric machine.
Figure 3B:
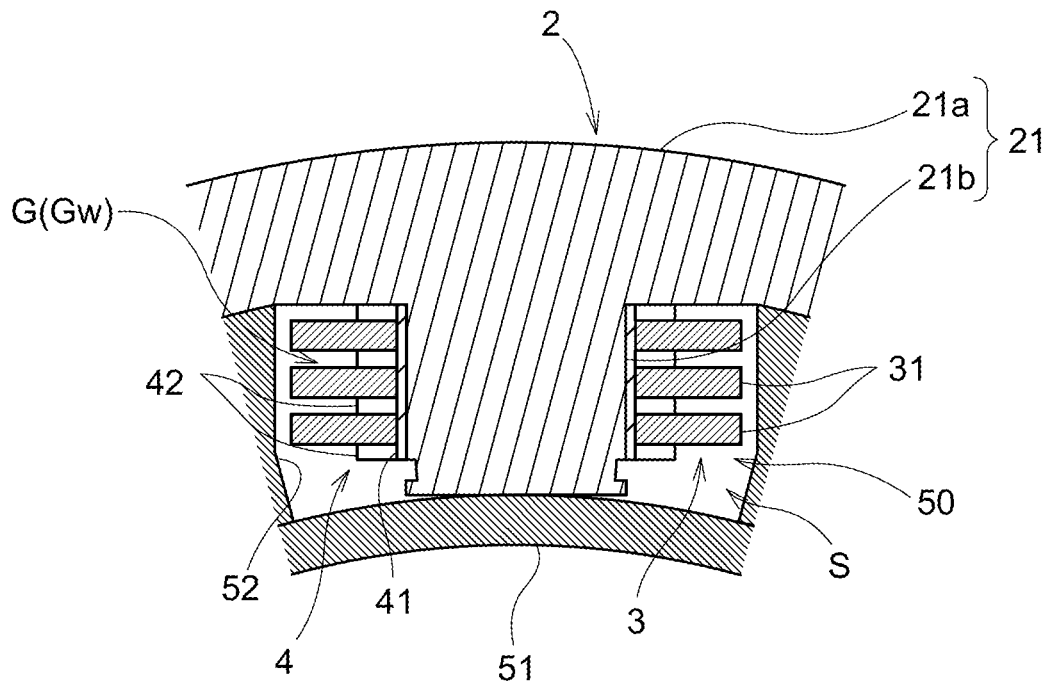

A configuration of a rotating electric machine according to an embodiment will be described with reference to FIGS. 1 to 3B. FIG. 1 is a longitudinal cross-sectional view of a rotating electric machine 100 according to an embodiment, cut in a plane perpendicular to the axial direction of a rotary shaft 101. FIG. 2 is a cross-sectional view of the rotating electric machine 100 viewed from the direction of arrow A in FIG. 1. FIGS. 3A and 3B are both longitudinal cross-sectional views of a part of the rotating electric machine 100. FIG. 3A is a view of the rotating electric machine 100 cut at a position where a notched section 421 is not provided in a spacer section 42, and FIG. 3B is a view of the rotating electric machine 100 cut at a position where the notched section 421 is provided in the spacer section 42.

The rotating electric machine 100 is used, for example, as a fan motor for propulsion of an aircraft (electric aircraft), and includes a rotor 1, a stator 2, a coil 3, a coil holding member 4, a space forming member 5, a cooling medium supply section 6, and the like.

(Rotor 1)

The rotor 1 includes a columnar rotor core 11. The outer peripheral surface of the rotor core 11 is provided with a permanent magnet 12 divided into a cylindrical or arched shape. In addition, in the center of the rotor core 11 in the radial direction, a columnar penetrating portion is provided through the axial direction, into which the rotary shaft 101 is inserted. The rotary shaft 101 is longer than the rotor 1 in the axial direction and is provided with the vicinity of both ends protruding from the both ends of the rotor 1.

(Stator 2)

The stator 2 is a substantially cylindrical member and is disposed to surround the outer peripheral surface of the rotor 1. The stator 2 includes a stator core 21. The stator core 21 is integrally composed of a cylindrical yoke 21a and a plurality of teeth 21b protruding inwardly in the radial direction from the inner peripheral surface thereof. Each of the teeth 21b is formed over the entire axial direction from one end to the other end of the stator 2. The plurality of teeth 21b are arranged at intervals along the circumferential direction, and a gap called a slot S is formed between adjacent teeth 21b.

(Coil 3)

The coil 3 includes a conductor (coil conductor) 31 that is wound around each of the teeth 21b and disposed in the slot S. However, as will be described below, in this rotating electric machine 100, the coil conductor 31 is not wound directly around the teeth 21b, but is wound around the teeth 21b via the coil holding member 4 described below.

The coil 3 is a three-phase coil including a U-phase coil, a V-phase coil, and a W-phase coil, each end of which is drawn outward in the radial direction from one end side in the axial direction of the stator 2 and connected to one end of a power line (not illustrated in the figure) of each phase, respectively. The other end of the power line of each phase is connected to a drive unit, and when a three-phase alternating current voltage is applied to the coil 3 from the drive unit, the rotor 1 rotates and the rotational driving force is output from the rotary shaft 101.

(Coil Holding Member 4)

The coil holding member 4 is a member that holds the coil 3. The coil conductor 31 is wound around the coil holding member 4 in advance, and the coil holding member 4 around which the coil conductor 31 is wound is attached to the teeth 21b, and thus the coil conductor 31 is wound around the teeth 21b and disposed in the slot S. The configuration of the coil holding member 4 will be described below.

(Space Forming Member 5)

The space forming member 5 is a member that forms a space (coil housing space) 50 for housing the coil 3 disposed in the slot S, and includes a division wall 51, a plurality of partition walls 52, a pair of lid sections 53a and 53b, and the like.

The division wall 51 is a thin-walled cylindrical member and is disposed in the space between the rotor 1 and the stator 2. The division wall 51 has an axial length that is approximately the same as that of the stator 2, and is provided in overall contact with the tip of each of the teeth 21b on the outer peripheral surface. This makes each slot S a space that is separated from the space on the rotor 1 side.

The partition wall 52 is a long, substantially plate-shaped member and is disposed at the substantially center of the adjacent teeth 21b in each slot S. The longitudinal dimension of the partition wall 52 is approximately the same as the axial dimension of the stator 2, and the partition wall 52 extends from one end of the slot S to the other end. In addition, the partition wall 52 is provided in contact with the inner peripheral surface of the yoke 21a at one end in the radial direction of the stator 2 and in contact with the outer peripheral surface of the division wall 51 at the other end. As a result, each slot S is divided into approximately two equal parts in the circumferential direction of the stator 2.

Each of the pair of lid sections 53a and 53b is a circular or disc-shaped member, and is disposed at each end of the stator 2 in the axial direction to block the opening end of each slot S facing the end.

The division wall 51, the partition wall 52, and the pair of lid sections 53a and 53b form the coil housing space 50. That is, the coil conductor 31 disposed in each slot S is housed in the coil housing space 50 surrounded by the teeth 21b, the partition wall 52, the division wall 51, and the pair of lid sections 53a and 53b.

(Cooling Medium Supply Section 6)

The cooling medium supply section 6 is an element that supplies a cooling medium to the coil housing space 50 formed in each slot S, and includes a circulation flow channel 61, a pump 62, a cooler 63, and the like. Various fluids can be used as the cooling medium, but here, for example, oil (cooling oil) is used.

The circulation flow channel 61 is a flow channel for distributing the cooling medium, one end of which is connected with an introduction port 531a provided on one lid section 53a, and the other end of which is connected with an outlet port 531b provided on the other lid section 53b. Each of the lid sections 53a and 53b has a branch flow channel 532a (532b) that is connected at one end to the introduction port 531a (or the outlet port 531b) and branches off in the middle to connect with each coil housing space 50. That is, the circulation flow channel 61 is connected to each coil housing space 50 via the branch flow channels 532a and 532b, and the cooling medium introduced from the circulation flow channel 61 via the introduction port 531a flows into each coil housing space 50 via the branch flow channel 532a. The cooling medium flowing out from each coil housing space 50 is led through the branch flow channel 532b and through the outlet port 531b to the circulation flow channel 61.

The pump 62 and the cooler 63 are both inserted in the middle of the circulation flow channel 61. When the pump 62 is driven, the cooling medium circulates through the circulation flow channel 61, and the cooling medium is distributed in each coil housing space 50. Then, the cooling medium circulating in the circulation flow channel 61 is cooled by the cooler 63 installed in the middle of the channel, which takes away heat from the cooling medium.

As the cooling medium is distributed in the coil housing space 50, the coil 3 disposed therein is directly cooled by the cooling medium.

<2. Coil Holding Member 4>

A configuration of the coil holding member 4 will be described with reference to FIGS. 4A to 5B in addition to FIGS. 1 to 3B. FIGS. 4A and 4B and FIGS. 5A and 5B are both perspective views illustrating an example configuration of the coil holding member 4.

The coil holding member 4 is a member that holds the coil 3, and includes a base section 41 and the spacer section 42.

The base section 41 is a member including a thin-walled band-shaped member formed into a frame corresponding to the teeth 21b. Specifically, the base section 41 includes a pair of long portions 41a and 41a, each end of which is connected via a pair of short portions 41b, and has a flat, substantially rectangular shape as a whole. The dimension of each long portion 41a is approximately the same as the dimension in the extending direction of the teeth 21b, and the dimension of each short portion 41b is approximately the same as the widthwise dimension of the teeth 21b.

Figure 4A:
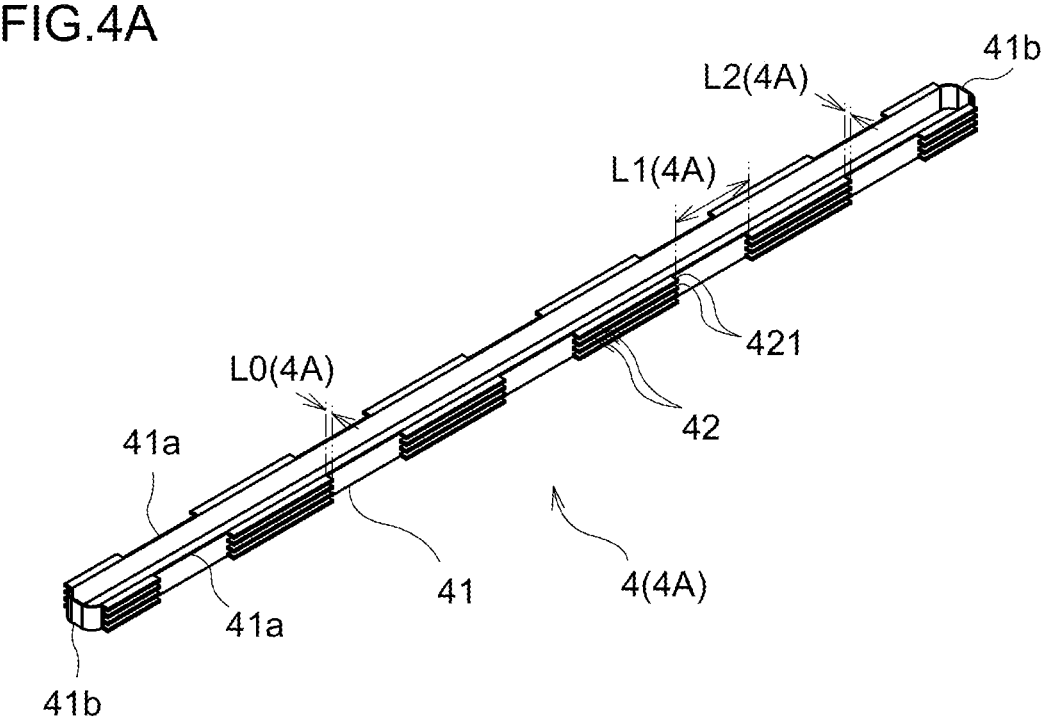
FIGS. 4A and 4B are perspective views illustrating an example configuration of a coil holding member.
Figure 4B:
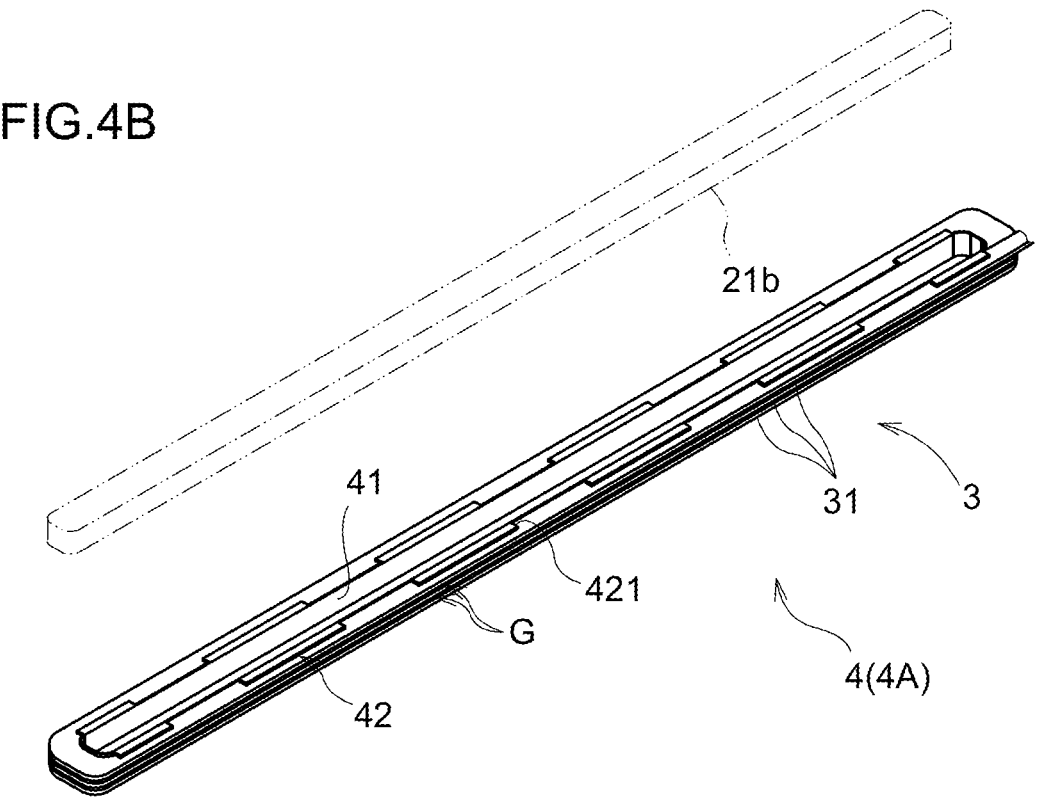
Figure 5A:
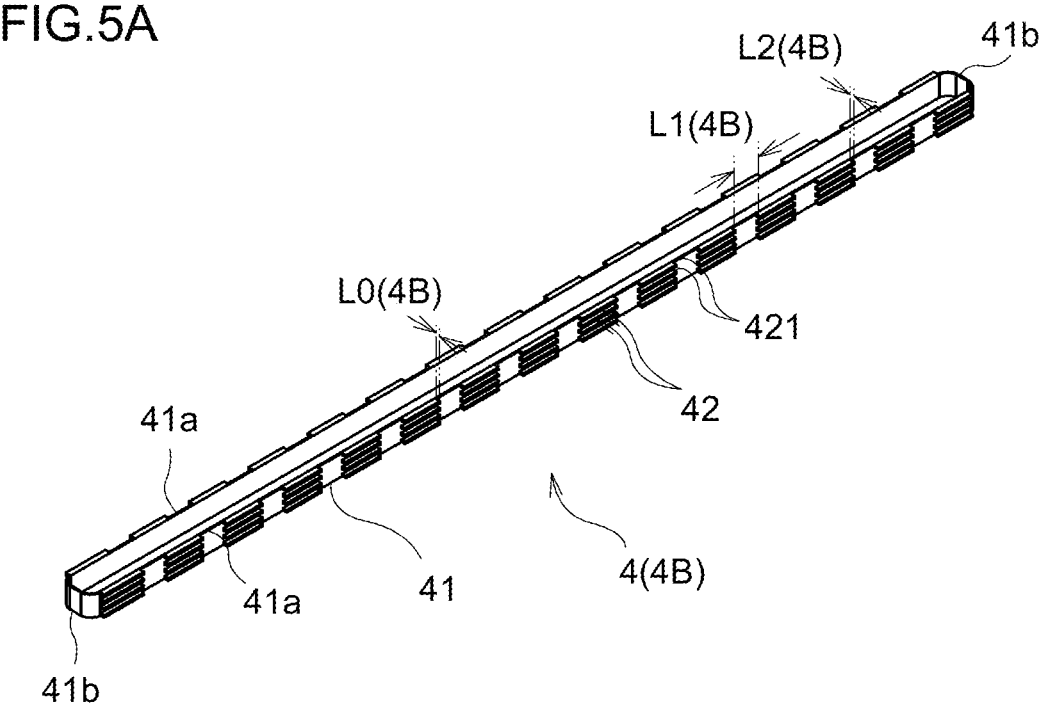
FIGS. 5A and 5B are perspective views illustrating an example configuration of a coil holding member.
Figure 5B:
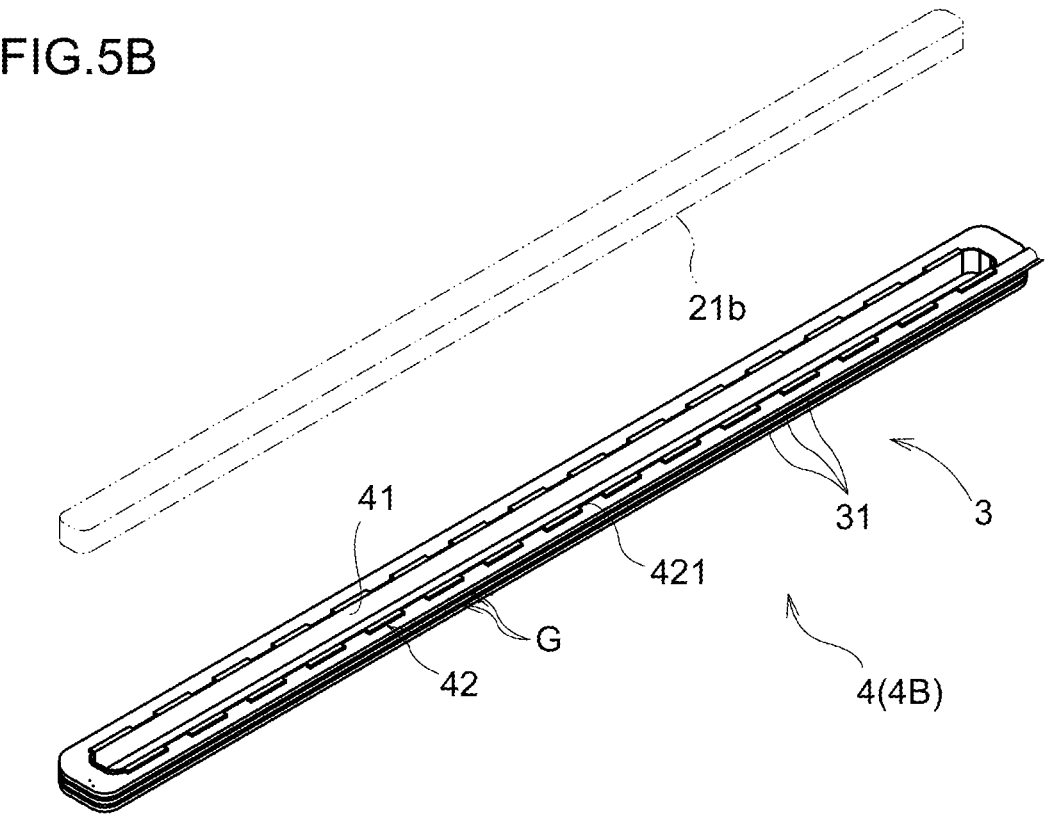

The coil conductor 31 is wound around the base section 41 (FIG. 4B and FIG. 5B). The coil conductor 31 specifically includes, for example, a flat band-shaped conductor whose cross section is smaller in the thickness direction than in the width direction, and is wound around the base section 41 with the width direction being oriented to match the normal direction of the outer peripheral surface of the base section 41. Here, the portion of the coil conductor 31 that circles around the base section 41 (and thus the teeth 21b) is referred to as "one turn". Each turn may be continuous or discontinuous. For example, in a case where a continuous coil conductor 31 is wound around, each turn is a continuous one. In addition, in a case where the coil conductor 31 is a stacked frame of conductor portions corresponding to one turn, each turn is discontinuous.

The spacer section 42 is a long plate-shaped member and is protruded on the outer surface of the long portion 41a in such a posture that the long direction is along the extending direction of the long portion 41a of the base section 41 and the width direction is along the normal direction of the outer surface of the base section 41. The dimension in the extending direction of the spacer section 42 is approximately the same as the dimension of the long portion 41a of the base section 41, and the spacer section 42 extends from one end of the long portion 41a to the other end. Although the widthwise dimension (i.e., the protruding dimension from the base section 41) L0 of the spacer section 42 can be specified as appropriate, it is also preferable that it be approximately ½ to ⅓ of the widthwise dimension of the coil conductor 31.

On each of the pair of long portions 41a and 41a of the base section 41, a number of spacer sections 42 corresponding to the number of turns of the coil conductor 31 are provided in multiple stages. In the example illustrated in the figure, the number of turns of the coil conductor 31 is three, and four spacer sections 42, for which one is added to this number of turns, are arranged at a fixed interval (pitch) in each long portion 41a. The pitch at this time is approximately the same as the thickness of the coil conductor 31.

The coil conductor 31 is wound around the base section 41 in such a manner the end in the width direction is inserted between the spacer sections 42 of adjacent stages, and is held between the spacer sections 42 of the adjacent stages. Accordingly, the spacer section 42 is inserted between turns of the coil conductor 31 wound around the base section 41. By inserting the spacer section 42 between the turns, a gap G corresponding to the thickness of the spacer section 42 is defined between the turns (FIG. 2 and FIGS. 3A and 3B). That is, the spacer section 42 is a member that holds the coil conductor 31 and defines the gap G between the turns.

For example, when a continuous coil conductor 31 is wound around the base section 41 (i.e., when each turn is continuous), the coil conductor 31 is wound around the base section 41 while alternately passing through the long portion 41a and the short portion 41b. However, as described above, in the long portion 41a, the coil conductor 31 is wound in such a manner that the end in the width direction is inserted between the spacer sections 42 of the adjacent stages. Here, each spacer section 42 is provided in a horizontal posture (i.e., in such a posture that the position in the height direction is constant over the entire extending direction), and the coil conductor 31 is wound in a substantially horizontal posture by being guided by the spacer section 42 in the long portion 41a. Then, the coil conductor 31, which has reached the other long portion 41a via the one short portion 41b, is guided by the spacer section 42 of the same height as the previous one in the long portion 41a, and is continuously wound in the substantially horizontal posture. Then, the coil conductor 31 which has reached the other short portion 41b is bent diagonally downward (or upward) here and led downward (or upward) by the thickness of the spacer section 42 and the coil conductor per se 31 than the coil conductor 31 being wound previously. Then, the coil conductor 31 is again wound in the substantially horizontal posture by being guided by the spacer section 42 of the same stage in the pair of long portions 41a and one short portion 41b sandwiched between them. Thus, the coil conductor 31 is wound around the base section 41 in a substantially horizontal posture, at least in each long portion 41a. Therefore, the gap G defined between the turns will extend substantially horizontally.

Each spacer section 42 has a notched section 421, which is a portion cut out in such a manner that the widthwise dimension of the spacer section 42 is relatively short, in the middle of its extension (i.e., in the middle of the extending direction of the long portion 41a).

The number, disposition (interval (pitch)) of adjacent notched sections 421), shape, dimension (lengthwise dimension L1, widthwise dimension L2), and the like of the notched section 421 provided in the spacer section 42 can be specified as appropriate as long as the function of the spacer section 42 (i.e., the function of holding the coil conductor 31 between the spacer sections 42 of adjacent stages and the function of defining a gap G between the turns) is not impaired. However, the "lengthwise" here refers to the extending direction of the spacer section 42 (i.e., the extending direction of the long portion 41a), and the "widthwise" refers to the protruding direction of the spacer section 42 from the base section 41.

For example, in the coil holding member 4 (4A) illustrated in FIGS. 4A and 4B, the number of the notched sections 421 provided in the spacer section 42 is five. In addition, the five notched sections 421 are disposed at a fixed pitch. Moreover, each notched section 421 has a right-angled corner portion. That is, each notched section 421 has a rectangular shape in plan view. Further, the lengthwise dimension L1 (4A) of each notched section 421 is approximately ¾ of the lengthwise dimension of the unnotched section (the uncut portion in the spacer section 42). Furthermore, the widthwise dimension L2 (4A) of each notched section 421 is approximately the same as widthwise dimension L0 (4A) of the spacer section 42. That is, the notched section 421 is formed by cutting a portion of the spacer section 42 over the entire width direction, and the widthwise dimension of the spacer section 42 is zero at the formation position of the notched section 421.

In addition, for example, in the coil holding member 4 (4B) illustrated in FIGS. 5A and 5B, the number of the notched sections 421 provided in the spacer section 42 is 14. Other points are the same as the notched section 421 provided in the coil holding member 4A illustrated in FIGS. 4A and 4B. That is, 14 notched sections 421 are disposed at a fixed pitch. Moreover, each notched section 421 has a right-angled corner portion. Moreover, the lengthwise dimension L1 (4B) of each notched section 421 is approximately ¾ of the lengthwise dimension of the unnotched section. Further, the widthwise dimension L2 (4B) of each notched section 421 is approximately the same as widthwise dimension L0 (4B) of the spacer section 42. However, the widthwise dimension L0 (4B) of the spacer section 42 of this coil holding member 4 (4B) is smaller than the widthwise dimension L0 (4A) of the spacer section 42 of the coil holding member 4A illustrated in FIGS. 4A and 4B.

In the assembly process of the rotating electric machine 100, first, the coil conductor 31 is wound around the coil holding member 4 (FIG. 4B and FIG. 5B). Specifically, the coil conductor 31 is wound around the base section 41 in such a manner the end in the width direction is inserted between the spacer sections 42 of adjacent stages. As a result, the spacer section 42 is inserted between the turns of the coil conductor 31 wound around the base section 41, and the gap G corresponding to the thickness of the spacer section 42 extending in the extending direction of the base section 41 is defined between the turns (FIG. 2 and FIGS. 3A and 3B).

Then, the coil holding member 4 around which the coil conductor 31 is wound is attached to the teeth 21b. The base section 41 is frame-shaped corresponding to the teeth 21b, and in a state where the base section 41 is mounted here so as to surround the periphery of the teeth 21b, the inner peripheral surface of the base section 41 contacts, as a whole, the outer peripheral surface of the teeth 21b without a gap. In addition, in this state, the spacer section 42 on each long portion 41a of the base section 41 extends along the slot S.

In this manner, the coil holding member 4 around which the coil conductor 31 is wound is attached to the teeth 21b, and thus the coil conductor 31 is wound around the teeth 21b via the coil holding member 4 and disposed in the slot S. Then, in this state, the gap G extending in the extending direction of the slot S is defined between the turns of the coil conductor 31.

<3. Cooling Manner of Coil 3>

The cooling manner of the coil 3 in the rotating electric machine 100 will be described with continued reference to FIGS. 1 to 5B.

In the rotating electric machine 100, as described above, the space forming member 5 forms the coil housing space 50 that houses the coil 3 (specifically, the coil conductor 31) disposed in each slot S, and the cooling medium supply section 6 supplies a cooling medium to the coil housing space 50 formed in each slot S. Consequently, the coil conductor 31 disposed in the coil housing space 50 is directly cooled by the cooling medium.

Here, the gap G extending in the extending direction of the slot S is defined between the turns of the coil conductor 31 disposed in the slot S. Therefore, a portion of the cooling medium supplied to the coil housing space 50 is distributed in this gap G. That is, a portion of the cooling medium flowing from the circulation flow channel 61 into each coil housing space 50 via the introduction port 531a and the branch flow channel 532a flows into the gap G from one end in the extending direction of the gap G, flows into the gap G, flows out from the other end in the extending direction of the gap G, and flows into the circulation flow channel 61 via the branch flow channel 523b and the outlet port 531b. By the cooling medium flowing through the gap G formed between the turns of the coil conductor 31, the contact area between the coil conductor 31 and the cooling medium is sufficiently secured, and the coil 3 is effectively cooled.

Figure 6:
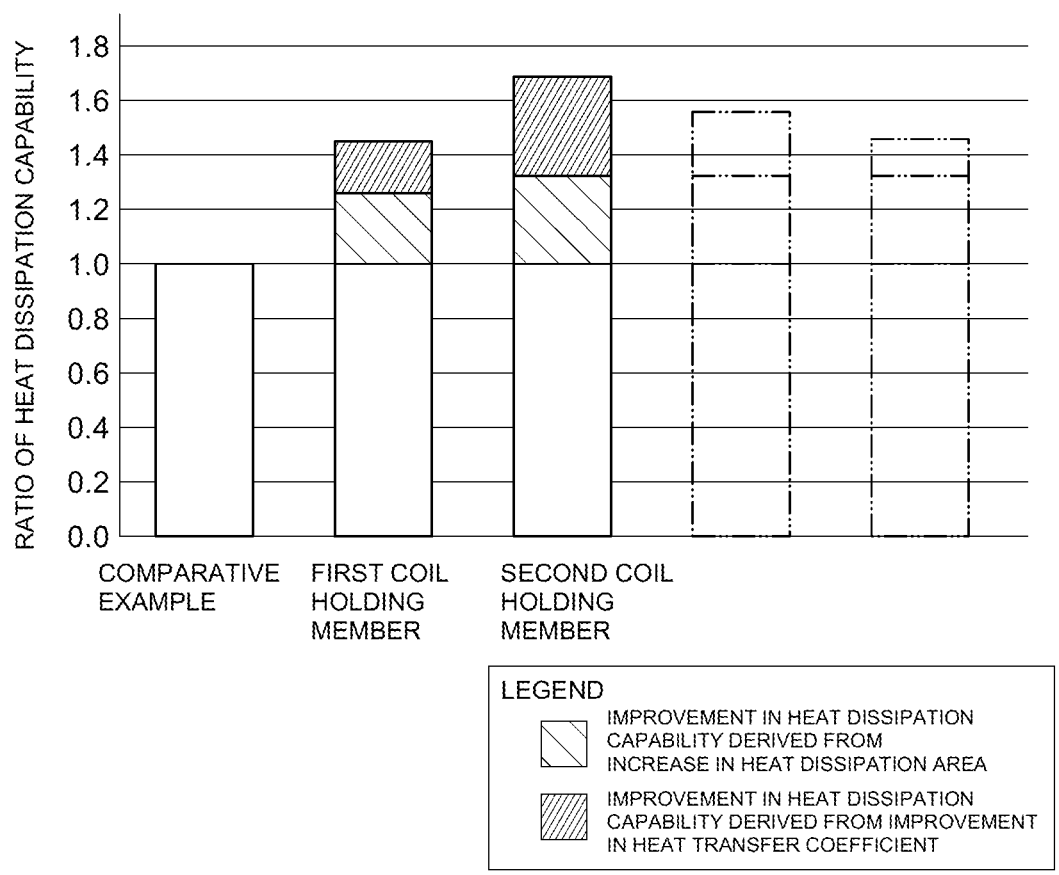
FIG. 6 is a graph illustrating the results of a simulation calculation of the heat dissipation capability achieved by a coil holding member according to a comparative example and first and second coil holding members.
Figure 7:
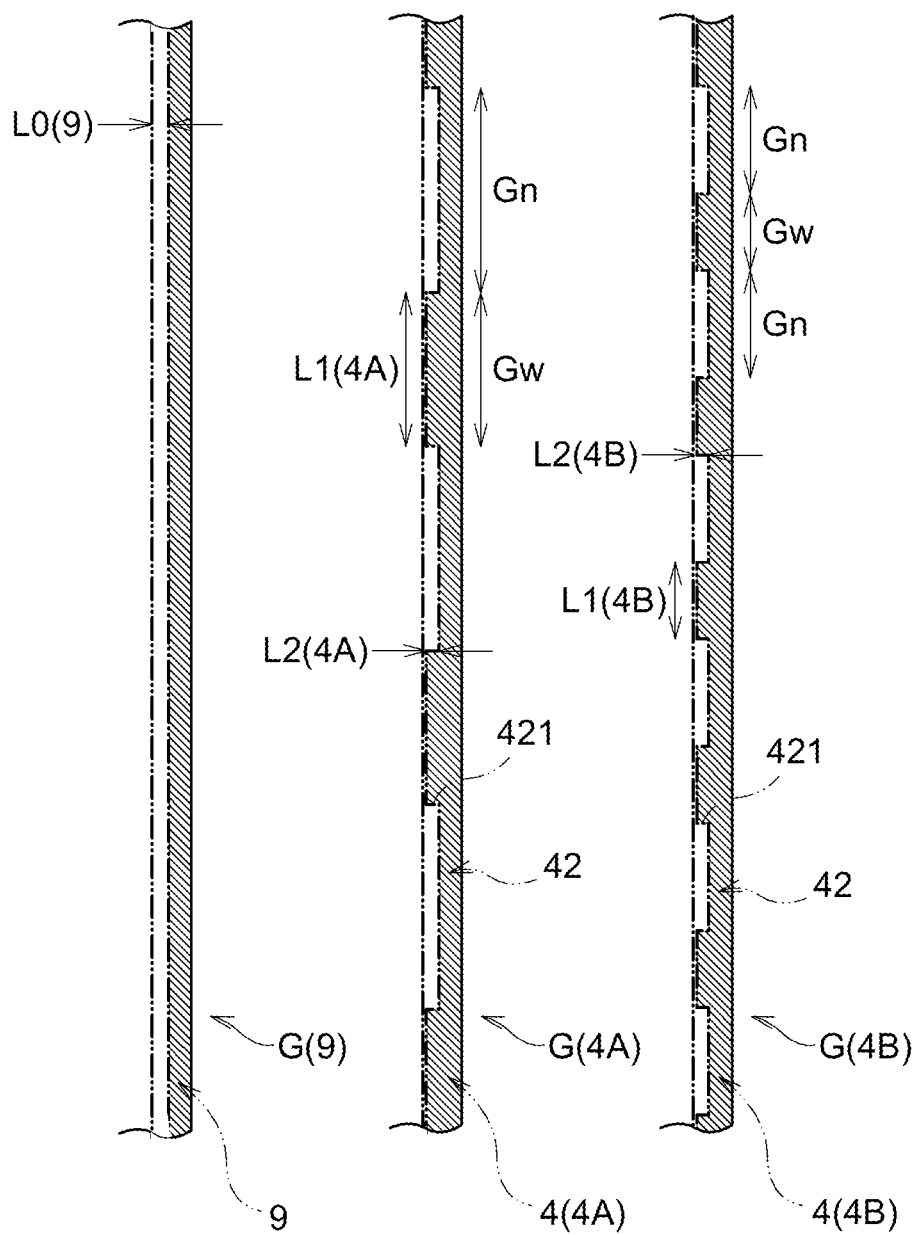
FIGS. 7A to 7C are a diagram schematically illustrating the shape of a gap formed by the coil holding member according to the comparative example and first and second coil holding members.

In particular, here, the notched section 421 is provided in the middle of the extension of the spacer section 42 defining the gap G, thereby effectively enhancing the capability to dissipate heat from the coil 3 (heat dissipation capability). This point will be described with reference to FIGS. 6 to 7C. FIG. 6 illustrates the results of a simulation calculation (thermo-fluid analysis) of the heat dissipation capability achieved by each of the coil holding member (first coil holding member) 4A according to a first form illustrated in FIGS. 4A and 4B and the coil holding member (second coil holding member) 4B according to a second form illustrated in FIGS. 5A and 5B.

However, here, the coil holding member 9 that differs from the first coil holding member 4A only in the fact that the notched section 421 is not provided in the spacer section 42 is considered to be a "comparative example", and the heat dissipation capability of the respective coil holding members 4A and 4B is indicated in a ratio when the heat dissipation capability achieved by the coil holding member 9 according to the comparative example is set to "1". FIGS. 7A to 7C schematically illustrate the shapes of gaps G(9), G(4A), and G(4B) (i.e., the shapes of the flow channels through which the cooling medium is distributed) formed by the coil holding member 9 according to the comparative example and the first and second coil holding members 4A and 4B, respectively.

As illustrated in FIG. 6, in the present simulation, the heat dissipation capability of the first coil holding member 4A was approximately 40% higher than that of the coil holding member 9 according to the comparative example. In addition, the heat dissipation capability of the second coil holding member 4B was approximately 70% higher than that of the coil holding member 9 according to the comparative example. The reasons for this can be considered as follows.

First, a temperature rise ΔT of the coil 3 is expressed by the following (formula 1) using a thermal resistance R and a heating value W.

$$\Delta T = R \times W \quad \text{(formula 1)}$$

In other words, when the heating value W is constant, the temperature rise ΔT is determined by thermal resistance R. This thermal resistance R is then expressed by the following (formula 2) using a heat transfer coefficient h and a heat dissipation area A.

$$R = 1/h \times 1/A \quad \text{(formula 2)}$$

In other words, the larger the heat dissipation area A and the higher the heat transfer coefficient h, the smaller thermal resistance R and the smaller the temperature rise ΔT. That is, the heat dissipation capability is enhanced.

Here, the coil holding members 4A and 4B provided with the notched section 421 have a larger heat dissipation area than that of the coil holding members 9 not provided with the notched section 421. The reasons for this are as follows.

That is, in the coil holding members 4A and 4B provided with the notched section 421, the contact area between the coil conductor 31 and the spacer section 42 is locally small in the portion where the notched section 421 is provided (FIG. 3B). For example, when comparing the first coil holding member 4A and the coil holding member 9 according to the comparative example in which the widthwise dimensions L0 of the spacer section 42 are equal to each other, the coil holding member 4A provided with the notched section 421 has a smaller contact area between the coil conductor 31 and the spacer section 42 by the total area of the region cut out by the notched section 421 than the coil holding member 9 not provided with the notched section 421. Put another way, by the provision of the notched section 421, the gap G (4A), which is a flow channel through which the cooling medium is distributed, is expanded by the total area of the notched region. Therefore, the contact area (that is, the heat dissipation area) between the cooling medium and the coil conductor 31 is secured to be wide by this total area. Thus, by providing the notched section 421, the heat dissipation area is increased by the total area of the notched region. As described above, the heat dissipation capability is improved in proportion to the increase in the heat dissipation area.

As illustrated in FIG. 6, in the present simulation, the improvement in the heat dissipation capability derived from the increase in the heat dissipation area was approximately 20% to 25% for the first coil holding member 4A and approximately 30% for the second coil holding member 4B, and the improvement in the heat dissipation capability derived from the increase in the heat dissipation area was larger for the second coil holding member 4B than for the first coil holding member 4A. This is considered to be because the second coil holding member 4B has a smaller widthwise dimension L0 of the spacer section 42 than that of the first coil holding member 4A, and thus the contact area between the spacer section 42 and the coil conductor 31 is smaller (i.e., the heat dissipation area is larger).

Needless to say, in order to increase the heat dissipation area, the contact area between the spacer section 42 and the coil conductor 31 may be reduced, and it is desirable to adjust the dimension L0 of the spacer section 42, the number, disposition, shape, dimensions L1 and L2, and the like of the notched section 421, so as to hold the coil conductor 31 with the minimum necessary contact area. However, as will be discussed below, each of these values also affects the heat transfer coefficient and pressure loss. Therefore, while taking these influences into consideration, it is preferable to adjust each value in such a manner that the increase in the heat dissipation area is as large as possible.

In addition, the coil holding members 4A and 4B provided with the notched section 421 have a higher heat transfer coefficient than that of the coil holding members 9 not provided with the notched section 421. The reasons for this are as follows.

That is, while the heat transfer coefficient is higher when the temperature difference (in this case, the temperature difference between the surface of the coil conductor 31 and the cooling medium in the vicinity thereof) is larger, this temperature difference becomes smaller and the heat transfer coefficient becomes lower as the flow distance of the cooling medium becomes longer. Then, when the flow distance of the cooling medium exceeds a predetermined distance called an approach section, the heat transfer coefficient converges to a constant value.

Here, the gap G(9) formed by the coil holding member 9 not provided with the notched section 421 has a straight shape with a constant width (FIG. 7A). In contrast, in the gaps G(4A) and G(4B) formed by the coil holding members 4A and 4B provided with the notched section 421, a wide portion Gw that is relatively wide appears in the middle of the extension thereof. In other words, the gaps G(4A) and G(4B) have a non-straight shape in which the wide portion Gw that is relatively wide and a narrow portion Gn that is relatively narrow appear alternately, that is, an uneven shape in plan view (FIGS. 7B and 7C).

When the cooling medium is distributed in the non-straight shaped gaps G(4A) and G(4B), turbulence is generated in the flow of the cooling medium and the cooling medium is stirred. Then, the positional exchange between the relatively high temperature portion and the relatively low temperature portion in the cooling medium is promoted, and the temperature of the cooling medium in the vicinity of the surface of the coil conductor 31 becomes lower. This increases the region before the flow distance passes through the approach section, that is, the region with relatively high heat transfer coefficient, and the heat transfer coefficient is improved. As mentioned above, the heat dissipation capability is improved as the heat transfer coefficient is improved.

As illustrated in FIG. 6, in the present simulation, the improvement in the heat dissipation capability derived from the improvement in the heat transfer coefficient was approximately 20% for the first coil holding member 4A and approximately 40% for the second coil holding member 4B, and the improvement in the heat dissipation capability derived from the improvement in the heat transfer coefficient was larger for the second coil holding member 4B than for the first coil holding member 4A. It is considered that this is because the second coil holding member 4B has a larger number of notched sections 421 than that of the first coil holding member 4A, and thus has a larger number of wide portions Gw appearing in the gap G(4B) and a higher stirring effect of the cooling medium.

In the present simulation, the range of improvement in the heat transfer coefficient was larger when the number of notched sections 421 is increased without changing the ratio of the lengthwise dimension L1 of the notched section 421 to the lengthwise dimension of the unnotched section. However, if the number of notched sections 421 is increased without changing the ratio of the lengthwise dimension L1 of the notched section 421 to the lengthwise dimension of the unnotched section, it is considered that when the number of notched sections 421 exceeds a certain upper limit, the range of improvement in the heat transfer coefficient becomes smaller as the number of notched sections 421 increases (virtual line in FIG. 6). This is because as the number of notched sections 421 increases, the lengthwise dimension of the unnotched section becomes shorter, and the cooling medium tends to stagnate in the wide portion Gw.

Thus, when the number of notched sections 421 is increased without changing the ratio of the lengthwise dimension L1 of the notched section 421 to the lengthwise dimension of the unnotched section, the range of improvement in the heat transfer coefficient is considered to follow the transition of initially increasing and then decreasing in the middle. Therefore, under given conditions, there exists a range of the number of notched sections 421 such that the heat transfer coefficient can be made higher than a predetermined value. Accordingly, it is also desirable to specify the number of the notched sections 421 within such a range. Specifically, for example, it is also preferable to specify by experiment or simulation a range of the number of notched sections 421 such that the heat transfer coefficient can be made higher than an arbitrarily selected predetermined value, and to set the number of notched sections 421 to a value selected from the specified range.

By the way, the pressure required to distribute the cooling medium in the gap G is defined by the pressure loss when the cooling medium is distributed in the gap G. In order to reduce the burden on the pump 62 and to achieve its downsizing, or the like, it is preferable that this pressure loss be small. Here, as described above, the gaps G(4A) and G(4B) formed by the coil holding members 4A and 4B provided with the notched section 421 have non-straight shapes in which the wide portion Gw and a narrow portion Gn appear alternately. As mentioned above, gaps G(4A) and G(4B) of this shape provide the advantages of increased heat dissipation area and improved heat transfer coefficient, but on the other hand, they appear to have the disadvantage of higher pressure loss compared to the straight shaped gap G(9). In reality, however, this is not always the case.

Figure 8:
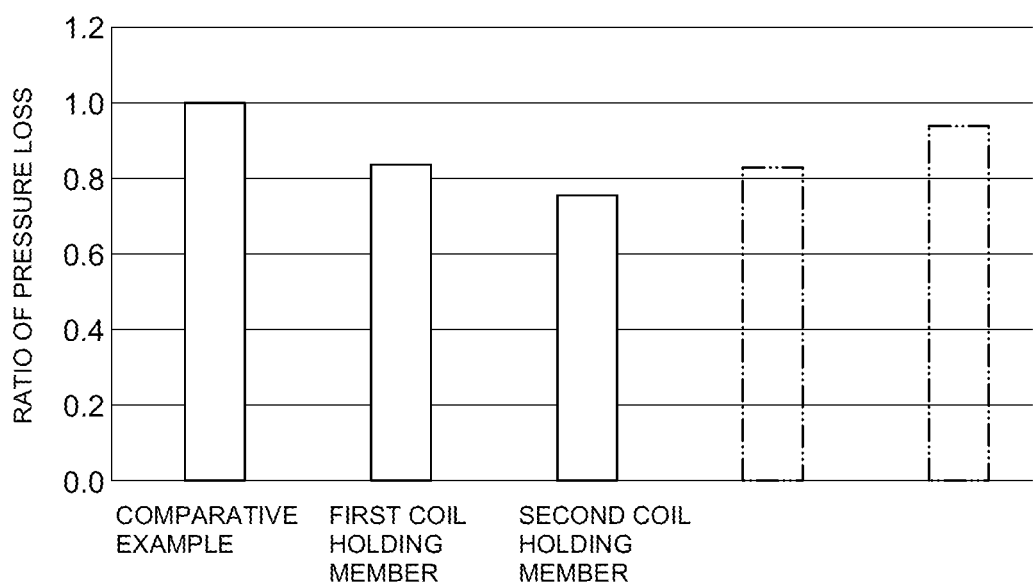
FIG. 8 is a graph illustrating the results of a simulation calculation of the pressure loss when a cooling medium is distributed in the gap formed by the first and second coil holding members.

FIG. 8 illustrates the results of a simulation calculation of the pressure loss when a cooling medium is distributed in the gaps G(4A) and G(4B) formed by the respective coil holding members 4A and 4B. However, here again, the pressure loss when the cooling medium is distributed in each of the gaps G(4A) and G(4B) is indicated in the ratio when the pressure loss when the cooling medium is distributed in the gap G(9) formed by the coil holding member 9 according to the comparative example is set to "1".

In the present simulation, the cooling medium is assumed to be oil (cooling oil), and its density is "980 kg/m³". The flow velocity of the cooling medium delivered to the gaps G(9), G(4A), and G(4B) is set to "0.5 m/s". Under these conditions, the pressure loss in the gaps G(4A) and G(4B) formed by the respective coil holding members 4A and 4B was approximately 20% lower than the pressure loss in the gap G(9) formed by the coil holding member 9 according to the comparative example. The reasons for this can be considered as follows.

First, when the cooling medium is distributed in the gaps G(9), G(4A), and G(4B), a pressure loss derived from friction (hereinafter referred to as "friction pressure loss") $\Delta P1$ occurs. Further, when the cooling medium is distributed in the non-straight shaped gaps G(4A) and G(4B) formed by the coil holding members 4A and 4B provided with the notched section 421, a further pressure loss $\Delta P2$ occurs when the cooling medium passes through the boundary between the narrow portion Gn and the wide portion Gw. In other words, in the non-straight shaped gaps G(4A) and G(4B), a pressure loss derived from the fact that the shape is non-straight (hereinafter referred to as "shape pressure loss") $\Delta P2$ occurs in addition to friction pressure loss $\Delta P1$. Needless to say, in the straight-shaped gap G(9) formed by the coil holding member 9 not provided with the notched section 421, the shape pressure loss $\Delta P2$ is zero.

The friction pressure loss $\Delta P1$ is given by (formula 3) below with the use of a friction coefficient $\lambda$, a length L of the flow channel formed by the gap G, a representative length (average flow channel width) d, a density $\rho$ of the cooling medium being distributed, and a flow velocity U of the cooling medium.

$$\Delta P1 = \lambda(L/d) \times (1/2)\rho U^2 \qquad \text{(formula 3)}$$

However, the friction coefficient $\lambda$ includes the reciprocal of the flow velocity (1/U), and $\Delta P1$ is proportional to the flow velocity U.

On the other hand, the shape pressure loss $\Delta P2$ derived from one notched section 421 (i.e., the shape pressure loss generated when passing through one wide portion Gw) is given by (formula 4) below with the use of a loss factor $\zeta$, the density $\rho$ of the cooling medium being distributed, and the flow velocity U of the cooling medium.

$$\Delta P2 = \zeta \times (1/2)\rho U^2 \qquad \text{(formula 4)}$$

However, the loss factor $\zeta$ is at most "approximately 1".

Under the present conditions, the shape pressure loss $\Delta P2$ calculated from the above (formula 4) was approximately 0.1 kPa, while the calculated friction pressure loss $\Delta P1$ calculated from the above (formula 3) was more than 100 times larger than this shape pressure loss $\Delta P2$. In other words, under the condition of relatively slow flow velocity of the cooling medium and relatively high viscosity of the cooling medium, as in the present condition, the friction pressure loss $\Delta P1$ becomes dominant and the shape pressure loss $\Delta P2$ is sufficiently small to be negligible with respect to the friction pressure loss $\Delta P1$.

In addition, this friction pressure loss $\Delta P1$ is proportional to the flow velocity U by the above (formula 3). Here, the gaps G(4A) and G(4B) formed by the coil holding members 4A and 4B provided with the notched section 421 have the wide portion Gw in the middle thereof. Here, the cross-sectional area (i.e., the cross-sectional area of the flow channel of the cooling medium) of the gaps G(4A) and G(4B) is locally widened. Therefore, the flow velocity of the cooling medium decreases when passing through the wide portion Gw. As a result, the friction pressure loss ΔP1, which is proportional to the flow velocity, becomes small.

Thus, at least under the conditions where the flow velocity of the cooling medium is relatively slow and the cooling medium is oil (or a substance having the same level of density and viscosity as oil), the shape pressure loss ΔP2 derived from the notched section 421 becomes sufficiently small with respect to the friction pressure loss ΔP1, and the reduction effect of the friction pressure loss ΔP1 by the formation of the wide portion Gw appears large. Therefore, it is considered that the pressure loss in the gaps G(4A) and G(4B) formed by the respective coil holding members 4A and 4B is lower than the pressure loss in the gap G(9) formed by the coil holding member 9 according to the comparative example. As a matter of fact, if the conditions such as the flow velocity and type of the cooling medium are different, the relation between the friction pressure loss ΔP1 and the shape pressure loss ΔP2 and each value also change, and thus the pressure loss is not always low when the notched section 421 is provided. However, at least under conditions similar to those described above, it can be said that the disadvantage of increased pressure loss due to the provision of the notched section 421 is unlikely to occur.

As illustrated in FIG. 8, in the present simulation, the gap G(B) formed by the second coil holding member 4B had a larger reduction in pressure loss than the gap G(A) formed by the first coil holding member 4A. It is considered that this is because the second coil holding member 4B has a larger number of notched sections 421 than that of the first coil holding member 4A, and has a smaller widthwise dimension L0 (4B) of the spacer section 42, and the reduction in the flow velocity of the cooling medium is large.

In the present simulation, the pressure loss decreased when the lengthwise dimension L1 of the notched section 421 is shortened without changing the ratio of the lengthwise dimension L1 of the notched section 421 to the lengthwise dimension of the unnotched section. However, if the lengthwise dimension L1 of the notched section 421 is further shortened without changing the ratio of the lengthwise dimension L1 of the notched section 421 to the lengthwise dimension of the unnotched section, when the dimension L1 falls below a certain lower limit, the effect of the shape pressure loss ΔP2 becomes non-negligible, and thus the pressure loss is considered to turn to increase (virtual line in FIG. 8).

Thus, when the lengthwise dimension L1 of the notched section 421 is reduced without changing the ratio of the lengthwise dimension L1 of the notched section 421 to the lengthwise dimension of the unnotched section, the pressure loss is considered to follow the transition of initially decreasing and then increasing in the middle. Therefore, under given conditions, there exists a range of the lengthwise dimension L1 such that the pressure loss can be equal to or less than a predetermined value. Accordingly, it is also desirable to specify the lengthwise dimension L1 of the notched section 421 within such a range. Specifically, for example, it is also preferable to specify a maximum value of the allowable pressure loss on the basis of the capacity of the pump 62 or the like, and further specify a range of the dimension L1 such that the pressure loss can be reduced to this maximum value or less by experiment or simulation, and set the lengthwise dimension L1 of the notched section 421 to a value selected from the specified range.

<4. Effect>

The rotating electric machine 100 according to the above embodiment has the rotor 1, the stator 2, and the coil 3 including the coil conductor 31 wound around teeth 21b provided on at least one of the rotor 1 and the stator 2, and includes the spacer section 42 configured to extend along the slot S formed between the teeth 21b and to be inserted between turns of the coil conductor 31 to define the gap G between the turns, and the cooling medium supply section 6 configured to distribute a cooling medium in the gap G. In addition, the notched section 421 cut out in such a manner that a widthwise dimension of the spacer section 42 is relatively short is provided in a middle of an extension of the spacer section 42.

According to this configuration, the gap G is formed between the turns of the coil conductor 31, and the cooling medium is distributed therein, and thus the contact area between the coil conductor 31 and the cooling medium is sufficiently secured, and the coil 3 is effectively cooled. In addition, the notched section 421 is provided in the middle of the extension of the spacer section 42 to form a locally wide region Gw in the middle portion of the gap G that is a flow channel of the cooling medium. The turbulence in the flow of the cooling medium and the stirring of the cooling medium as it passes through the non-straight shaped flow channel improves the heat transfer coefficient. In addition, the notched section 421 provided in the spacer section 42 reduces the contact area between the coil conductor 31 and the spacer section 42, which increases the contact area (that is, the heat dissipation area) between the coil conductor 31 and the cooling medium. The improvement in the heat transfer coefficient and the increase in the heat dissipation area both lead to the improvement in the heat dissipation capability, thus achieving high cooling performance.

In addition, in the rotating electric machine 100 according to the above embodiment, a plurality of the notched sections 421 are provided in the middle of the extension of the spacer section 42.

According to this configuration, a plurality of locally wide regions Gw are formed in the middle portion of the gap G that is a flow channel of the cooling medium. Therefore, the stirring action of the cooling medium is enhanced, and the heat transfer coefficient (and thus the heat dissipation capability) is greatly improved. This allows for particularly high cooling performance.

In addition, in the rotating electric machine 100 according to the above embodiment, the plurality of notched sections 421 are disposed at a fixed pitch.

According to this configuration, the heat dissipation capability is less likely to be biased depending on the location, and the coil 3 is uniformly cooled.

In addition, in the rotating electric machine 100 according to the above embodiment, it is preferable that the lengthwise dimension L1 of the notched section 421 is specified within a range such that a pressure loss when a cooling medium is distributed in the gap G is equal to or less than a predetermined value.

According to this configuration, since the pressure loss when distributing the cooling medium in the gap G is equal to or less than a predetermined value, the load on the mechanism (e.g., the pump 62) for distributing the cooling medium can be reduced.

<5. First Variation>

The shape of the notched section 421 provided in the spacer section 42 is not limited to the one illustrated in the above embodiment. That is, in the above embodiment, the notched section 421 is rectangular in plan view with the corner portions being right-angled, but the shape of the notched section 421 is not limited thereto.

Figure 9A:
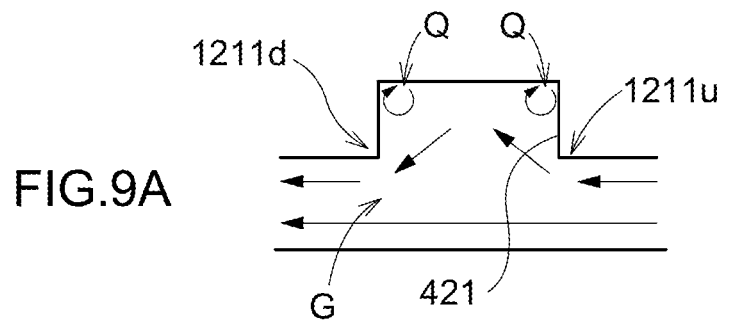
FIGS. 9A to 9F are a diagram illustrating the shape of a notched section according to a variation.
Figure 9B:
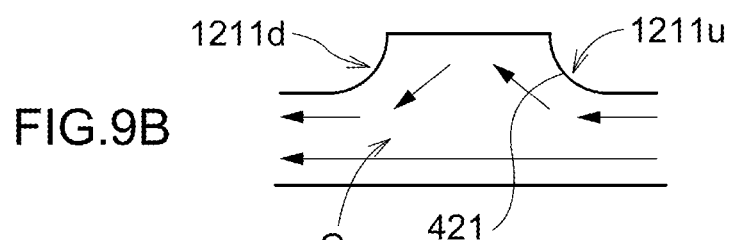
Figure 9C:
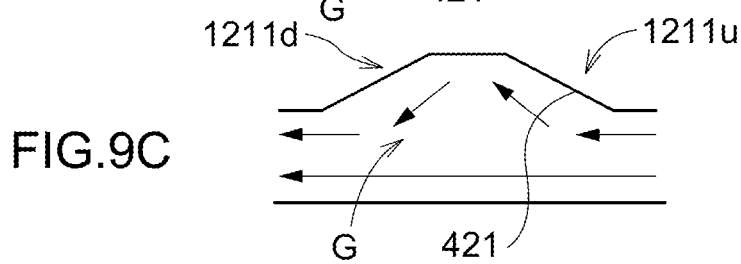
Figure 9D:
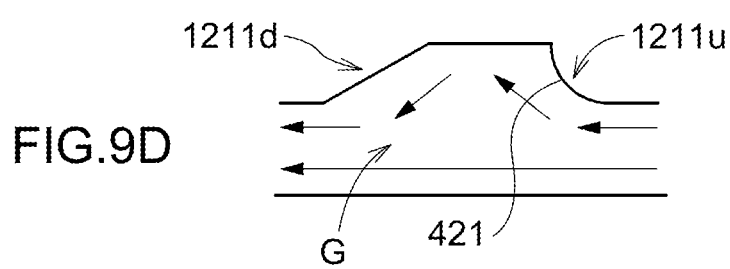
Figure 9E:
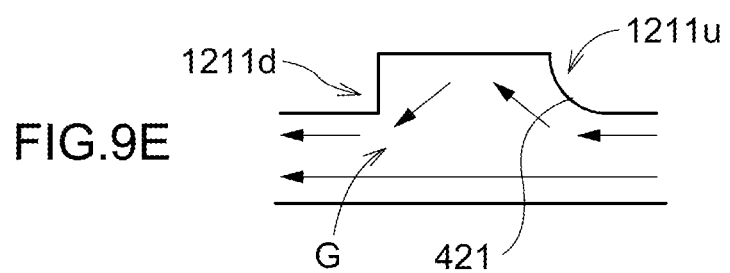
Figure 9F:
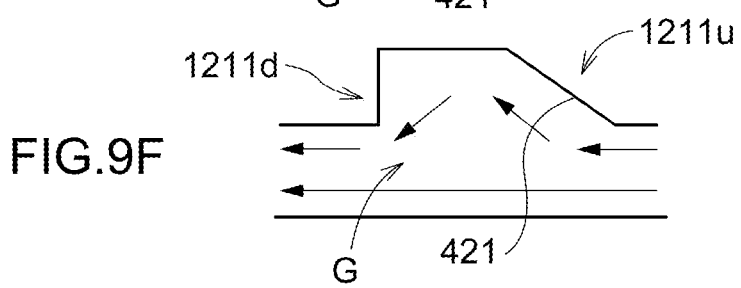

For example, each corner portion 1211u and 1211d may have a round shape, such as the notched section 421 illustrated in FIG. 9B. In addition, for example, each corner portion 1211u and 1211d may have a taper shape (C-chamfered), such as the notched section 421 illustrated in FIG. 9C. In addition, for example, as illustrated in the notched section 421 in FIG. 9D, the corner portion (upstream side corner portion) 1211u on the upstream side with respect to the flow of the cooling medium may be made into a round shape, and the corner portion (downstream side corner portion) 1211d on the downstream side with respect to the flow of the cooling medium may be made into a taper shape. Moreover, for example, the upstream side corner portion 1211u may be made into a round shape and the downstream side corner portion 1211d may be made into a right angle shape, as in the notched section 421 illustrated in FIG. 9E. Furthermore, for example, the upstream side corner portion 1211u may be made into a taper shape and the downstream side corner portion 1211d may be made into a right angle shape, as in the notched section 421 illustrated in FIG. 9F.

The shape of the corner portions 1211u and 1211d of the notched section 421 affects the ease of occurrence of stagnation Q. That is, when the corner portions 1211u and 1211d of the notched section 421 have, for example, a right angle shape (FIG. 9A), the flow channel width changes abruptly at the boundary between the wide portion Gw and the narrow portion Gn. Then, depending on the conditions, at the point where the cooling medium flows from the narrow portion Gn into the wide portion Gw, the flow of the cooling medium may be separated into one that goes straight and the other that stays in the wide portion Gw. Similarly, at the point where the cooling medium flows from the wide portion Gw to the narrow portion Gn, the flow of the cooling medium may be separated into one that stays in the wide portion Gw and one that goes straight. When these flow separations occur, the stagnation Q of the cooling medium is generated in the vicinity of the corner portions 1211u and 1211d. Since the flow channel of the cooling medium is close to zero in such stagnation Q, the heat transfer coefficient is reduced and the effective heat dissipation area is also reduced. Therefore, the heat dissipation capability may be reduced.

In this regard, when at least one of the corner portions 1211u and 1211d is made into a round shape or a taper shape, as the notched section 421 illustrated in FIGS. 9B to 9F, the change in the width of the flow channel is gradual. Thus, the flow separation is less likely to occur at the corner portions 1211u and 1211d, and the occurrence of stagnation Q of the cooling medium is less likely to be generated in the vicinity of the corner portions 1211u and 1211d. Therefore, the reduction in heat dissipation capability derived from the occurrence of stagnation Q is suppressed.

The effect of suppressing the occurrence of stagnation Q is highest when the corner portions 1211u and 1211d are made into a round shape, then in a taper shape, and lowest in a right angle shape. Therefore, from the viewpoint of suppressing the occurrence of the stagnation Q, a round shape is most preferable as the shape of the corner portions 1211u and 1211d, followed by a taper shape, and followed by a right angle shape.

The flow separation is more likely to occur at the upstream side corner portion 1211u than at the downstream side corner portion 1211d, and the stagnation Q is particularly likely to occur in the vicinity of the upstream side corner portion 1211u. Therefore, it is also preferable that at least the upstream side corner portion 1211u be made into a round shape or a taper shape.

In addition, the shape of the corner portions 1211u and 1211d also affects the ability to stir the cooling medium. That is, the cooling medium flowing through the gap G is stirred by greatly disturbing the flow when passing through the corner portions 1211u and 1211d of the notched section 421. The action of stirring the cooling medium is highest in a right angle shape, then in a taper shape, and lowest in the round shape. As mentioned above, the greater the stirring of the cooling medium, the higher the heat transfer coefficient and the better the heat dissipation capability. Therefore, from the viewpoint of stirring the cooling medium, a right angle shape is most preferable as the shape of the corner portions 1211u and 1211d, followed by a taper shape, and followed by a round shape.

In particular, the shape of the corner portions 1211u and 1211d is made into a taper shape to suppress the occurrence of stagnation Q of the cooling medium in the vicinity of the corner portions, while also ensuring the stirring effect of the cooling medium at the corner portions 1211u and 1211d. Therefore, it is possible to improve the heat transfer coefficient by stirring the cooling medium while suppressing the decrease in the heat transfer coefficient derived from the stagnation Q, and the heat dissipation capability can be increased in a balanced manner.

The cooling medium is particularly prone to stirring as it passes through the downstream side corner portion 1211d. Therefore, in order to effectively stir the cooling medium, it is preferable that at least the downstream side corner portion 1211d be made into a right angle shape or a taper shape.

Further, the shape of the corner portions 1211u and 1211d also affects the ease of bubble occurrence, pressure loss, and the like. For example, the tapered and rounded corner portions 1211d and 1211d are less prone to bubble occurrence and have lower pressure loss than the right-angled corner portions 1211u and 1211d. Therefore, in order to suppress the occurrence of bubbles or to reduce the pressure loss, it is preferable that the corner portions 1211u and 1211d be made into a round shape or a taper shape.

Needless to say, the shape of the corner portions 1211u and 1211d may be other than a right angle shape, a round shape, and a taper shape. In addition, the shape of the upstream side corner portion 1211u and the downstream side corner portion 1211d may be different, and the combination of the shapes is also free.

<6. Second Variation>

Figure 10:
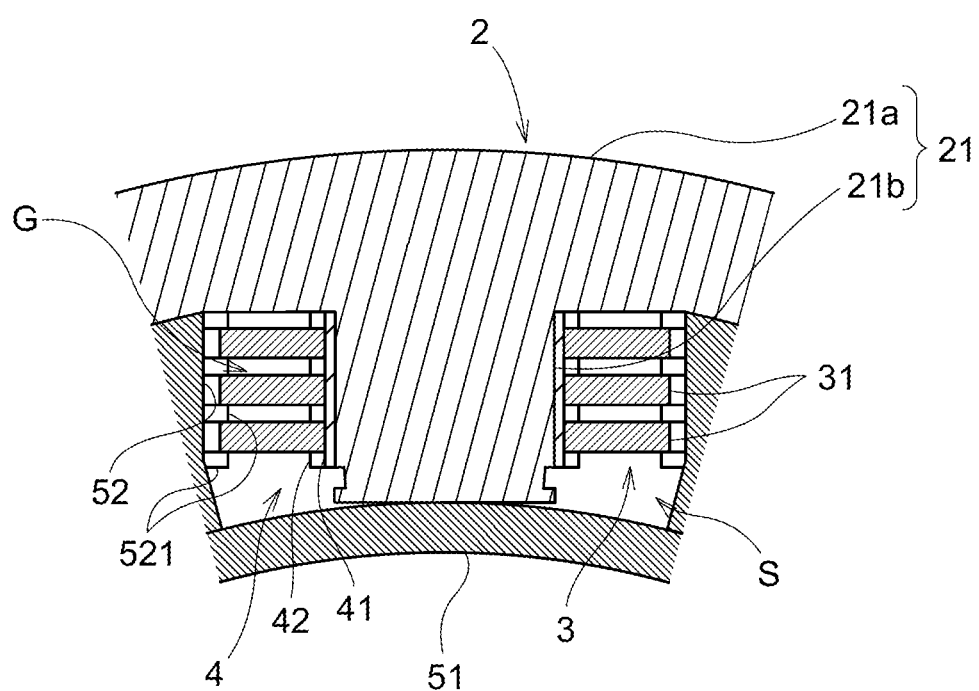
FIG. 10 is a diagram illustrating a part of a rotating electric machine according to a variation.

In the above embodiment, the spacer section 42 is provided in the base section 41, and the coil holding member 4 includes each of these sections 41 and 42, but the manner of providing the spacer section 42 is not limited thereto. For example, as illustrated in FIG. 10, a partition wall 52 may be provided with a spacer section 521. The configuration of the spacer section 521 in this case can be the same as that of the spacer section 42 provided in the base section 41.

When the spacer section 521 is provided in the partition wall 52, the coil holding member 4 may be omitted. However, as illustrated in FIG. 10, if the coil holding member 4 is provided with the spacer section 42 and the partition wall 52 is provided with the spacer section 521, the coil conductor 31 is held by the spacer sections 42 and 521 at both ends in the width direction, and thus the posture of the coil conductor 31 is maintained flat compared with the case where the coil conductor 31 is held only at one end in the width direction. As a result, the heat dissipation performance is stably maintained and the pressure loss in the flow channel formed by the gap G is hardly increased.

In addition, by providing the spacer section 42 in the coil holding member 4 and the spacer section 521 in the partition wall 52, the shape of the flow channel formed by the gap G can be adapted in various ways. For example, by making the disposition of the notched section provided in each of the spacer sections 42 and 521 in the same phase (i.e., by providing the notched section in facing positions), the difference between the wide portion Gw and the narrow portion Gn in the flow channel formed by the gap G can be increased. In addition, by shifting the disposition of the notched section in each of the spacer sections 42 and 521 by a half phase, the flow channel formed by the gap G can be made to be a meandering shape.

<7. Third Variation>

The number, disposition, shape, dimensions L1 and L2, and the like of the notched section 421 provided in the spacer section 42 are not limited to those illustrated in the above embodiment.

For example, the number of the notched section 421 provided in the middle of the extension of the spacer section 42 may be one. When one notched section 421 is provided, it is also preferable to provide the notched section 421 near the center of the spacer section 42 in the extending direction. In addition, the notched section may be provided not only in the middle of the extension of the spacer section 42, but also at the end of the extending direction of the spacer section 42.

For example, the notched section 421 needs not necessarily be disposed at a fixed pitch, and for example, the pitch may become narrower toward the center of the spacer section 42 in the extending direction.

In addition, for example, the widthwise dimension L2 of the notched section 421 may be smaller than the widthwise dimension of the spacer section 42.

<8. Fourth Variation>

The number, disposition, shape, lengthwise dimension, widthwise dimension L0, and the like of the spacer section 42 provided in the base section 41 are not limited to those illustrated in the above embodiment.

For example, in the above embodiment, each long portion 41a is provided with a number of spacer sections 42 equal to the number of turns of the coil conductor 31 plus one, and the spacer sections 42 are disposed on both sides of all turns of the coil conductor 31, but the number of spacer sections 42 may be equal to or less than the number of turns. For example, the number of the spacer sections 42 may be made smaller than the number of turns, and the spacer section 42 may be inserted between the turn bundles composed of a plurality of turns, and a gap G may be defined between the turn bundles.

In addition, for example, in the above embodiment, the plurality of spacer sections 42 provided in each long portion 41a are disposed at a fixed pitch, but the pitch between the spacer sections 42 need not be fixed.

Moreover, for example, in the above embodiment, the longitudinal dimension of the spacer section 42 is approximately the same as the dimension of the long portion 41a, but the longitudinal dimension of the spacer section 42 may be shorter than the dimension of the long portion 41a. That is, the spacer section 42 does not necessarily have to extend from one end of the long portion 41a to the other end.

In addition, the spacer section 42 may be formed from a single integrally formed part, or may be formed by assembling a plurality of divided parts. In the latter case, the plurality of parts may be disposed separately to form the spacer section 42, or the plurality of parts may be connected to form the spacer section 42.

Moreover, the thickness of the spacer section 42 can also be specified as appropriate. However, the smaller the thickness of the spacer section 42 (i.e., the thinner it is), the smaller the thickness of the gap G (i.e., the thickness of the flow channel of the cooling medium) defined between the turns of the coil conductor 31. As the thickness of the flow channel decreases, the temperature boundary layer of the cooling medium flowing through the flow channel becomes thinner, and the thickness of the relatively cold layer portion of the cooling medium flowing through the flow channel becomes thinner. In addition, the thinner the temperature boundary layer, the larger the temperature difference between the surface of the coil conductor 31 and the cooling medium in the vicinity thereof, and the better the heat transfer coefficient. In other words, the smaller the thickness of the spacer section 42, the better the heat transfer coefficient. Therefore, it is preferable that the thickness of the spacer section 42 be as small as possible as long as the function of the spacer section 42 (i.e., the function of holding the coil conductor 31 between the spacer sections 42 of adjacent stages and the function of defining the gap G between turns) is not impaired. As an example, the thickness of the spacer section 42 can be, for example, approximately ½ to ¹⁄₁₀ of the thickness of the coil conductor 31.

<9. Other Variations>

In each of the above embodiments, the configurations of the rotor 1, the stator 2, and the coil 3, and the like are not limited to those illustrated above. For example, the rotor 1, or (and) the stator 2 may have a structure in which a plurality of electromagnetic steel plates are stacked in the axial direction. In addition, for example, the rotor may be configured as an outer rotor type in which the rotor is arranged outside the stator. Moreover, for example, the teeth may be formed on the side of the rotor.

In each of the above embodiments, a case has been illustrated in which the present invention is applied to a rotating electric machine (rotary electric machine) 100 used as a fan motor for propulsion of an aircraft, but it goes without saying that the present invention can be applied to various other rotating electric machines.

Other configurations can be varied to the extent that they do not depart from the purpose of the present invention.

REFERENCE SIGNS LIST

1 . . . Rotor
2 . . . Stator
3 . . . Coil
31 . . . Coil conductor
4 . . . Coil holding member
41 . . . Base section
42 . . . Spacer section
421 . . . Notched section
5 . . . Space forming member
51 . . . Division wall
52 . . . Partition wall
53a, 53b . . . Lid section
50 . . . Coil housing space
6 . . . Cooling medium supply section
61 . . . Circulation flow channel
62 . . . Pump
63 . . . Cooler
100 . . . Rotating electric machine

What is claimed is:

1. A rotating electric machine having a rotor, a stator, and a coil including a coil conductor wound around teeth provided on at least one of the rotor and the stator, the rotating electric machine comprising:
a spacer section extending along a slot formed between the teeth, inserted between turns of the coil conductor, and arranged alternately with the turns to separate the turns, and defines a gap between the turns; and a cooling medium supply section configured to supply a cooling medium to a coil housing space formed in each slot between the teeth, wherein a notched section is provided in a middle of an extension of the spacer section, a dimension of a portion of the spacer section where the notched section is formed is shorter than a dimension of a portion of the spacer section where the notched section is not formed in a width direction along a direction, in which the spacer section protrudes from the teeth, so that the gap is expanded by a total area of the notched section, and when the cooling medium supply section supplies the cooling medium to the coil housing space, a portion of the cooling medium flows into the gap and is distributed in the gap.

2. The rotating electric machine according to claim 1, wherein the spacer section extends in an axial direction of the stator.

3. The rotating electric machine according to claim 1, wherein a plurality of the notched sections are disposed at a fixed pitch.

4. The rotating electric machine according to claim 1, wherein at least one of corner portions of the notched section has a round shape.

5. The rotating electric machine according to claim 1, wherein at least one of corner portions of the notched section has a taper shape.

6. The rotating electric machine according to claim 1, wherein the cooling medium supplied to the coil housing space from one end side thereof flows out from the other end side thereof and circulates to the one end side of the coil housing space through a circulation flow channel.

7. A rotating electric machine having a rotor, a stator, and a coil including a coil conductor wound around teeth provided on at least one of the rotor and the stator, the rotating electric machine comprising:

a spacer section extending along a slot formed between the teeth, inserted between turns of the coil conductor, and arranged alternately with the turns to separate the turns, and defines a gap between the turns; and a cooling medium supply section configured to supply a cooling medium to a coil housing space formed in each slot between the teeth, wherein a notched section is provided in a middle of an extension of the spacer section, a dimension of a portion of the spacer section where the notched section is formed is shorter than a dimension of a portion of the spacer section where the notched section is not formed in a width direction along a direction, in which the spacer section protrudes from the teeth, so that the gap is expanded by a total area of the notched section, and when the cooling medium supply section supplies the cooling medium to the coil housing space, a portion of the cooling medium flows into the gap and is distributed in the gap, the cooling medium flows through an expanded portion where the notched section is formed and a non-expanded portion where the notched section is not formed in an extending direction of the spacer section.

8. The rotating electric machine according to claim 7, wherein the spacer section extends in an axial direction of the stator.

9. The rotating electric machine according to claim 7, wherein a plurality of the notched sections are disposed at a fixed pitch.

10. The rotating electric machine according to claim 7, wherein at least one of corner portions of the notched section has a round shape.

11. The rotating electric machine according to claim 7, wherein at least one of corner portions of the notched section has a taper shape.

12. The rotating electric machine according to claim 7, wherein the cooling medium supplied to the coil housing space from one end side thereof flows out from the other end side thereof and circulates to the one end side of the coil housing space through a circulation flow channel.

13. A rotating electric machine having a rotor, a stator, and a coil including a coil conductor wound around teeth provided on at least one of the rotor and the stator, the rotating electric machine comprising:

a spacer section extending along a slot formed between the teeth, inserted between turns of the coil conductor, and arranged alternately with the turns to separate the turns, and defines a gap between the turns; and a cooling medium supply section configured to supply a cooling medium to a coil housing space formed in each slot between the teeth, wherein a plurality of the notched sections are disposed at a fixed pitch and are provided in a middle of the extension of the spacer section, a dimension of a portion of the spacer section where the notched section is formed is shorter than a dimension of a portion of the spacer section where the notched section is not formed in a width direction along a direction, in which the spacer section protrudes from the teeth, so that the gap is expanded by a total area of the notched section, and when the cooling medium supply section supplies the cooling medium to the coil housing space, a portion of the cooling medium flows into the gap and is distributed in the gap, the cooling medium flows through an expanded portion where the notched section is formed and a non-expanded portion where the notched section is not formed in an extending direction of the spacer section.

14. The rotating electric machine according to claim 13, wherein the spacer section extends in an axial direction of the stator.

15. The rotating electric machine according to claim 13, wherein a corner portion of the notched section on an upstream side with respect to the flow of the cooling medium has a round shape, and the corner portion of the notched section on a downstream side with respect to the flow of the cooling medium has a taper shape.

16. The rotating electric machine according to claim 13, wherein at least one of corner portions of the notched section has a round shape.

17. The rotating electric machine according to claim 13, wherein at least one of corner portions of the notched section has a taper shape.

18. The rotating electric machine according to claim 13, wherein the cooling medium supplied to the coil housing space from one end side thereof flows out from the other end side thereof and circulates to the one end side of the coil housing space through a circulation flow channel.

* * * * *